US005571487A

United States Patent [19]

Sato

[11] Patent Number: 5,571,487

[45] Date of Patent: Nov. 5, 1996

[54] INSTALLATION FOR SUPPLYING FLUID TO A UTILIZATION STATION AT THE UTILIZATION SITE

[75] Inventor: Yasuo Sato, Paris, France

[73] Assignee: L'Air, Liquide, Societe Anonyme Pour l'Etude et l'Exploitation des Procedes Georges Claude, Paris Cedex, France

[21] Appl. No.: 400,569

[22] Filed: Mar. 8, 1995

Related U.S. Application Data

[62] Division of Ser. No. 202,497, Feb. 28, 1994, Pat. No. 5,433,921.

[30] Foreign Application Priority Data

Mar. 3, 1993 [FR] France ........................ 93 02452

[51] Int. Cl.[6] ........................ B01J 19/14

[52] U.S. Cl. ........................ 422/291; 422/40

[58] Field of Search ........................ 422/40, 41, 62, 422/168, 245, 291, 105

[56] References Cited

U.S. PATENT DOCUMENTS 5,186,895 2/1993 Onofusa et al. ........................ 422/62

FOREIGN PATENT DOCUMENTS 58-81300 5/1983 Japan .

*Primary Examiner*—Timothy McMahon
*Attorney, Agent, or Firm*—Young & Thompson

[57] ABSTRACT

Process and installation for supplying at least one pure active gas to at least one utilization station ($P_i$) in a first building (A) at a utilization site. It comprises the steps of providing, at the utilization site, a second safety building (B) at a distance from the first building (A), providing at least one source (2; 7; 10) of said gas in the second building (B), and transferring, by at least one safety conduit (C) of high cleanliness, the gas, at a low pressure, to the utilization station ($P_i$). There is also taught the step of purifying (4; 11) the gas in the second building (B) before transfer to the conduit (C). The pure gas is prepared in situ (2, 4; 10, 11) in the second building (B). There can alternatively be provided, adjacent to the second building (B), at least one source of vector gas (1), with mixing in controlled fashion (6; 9), in the second building (B), the pure active gas with the vector gas before transfer of the mixture to the conduit (C). Apparatus is provided for analyzing (3; 5, 5'; 8, 8'; 12), in the second building (B), the purity and/or the mixing rate of the active gas and/or of a mixture of gas containing the active gas, before transfer to the conduit (C).

6 Claims, 1 Drawing Sheet

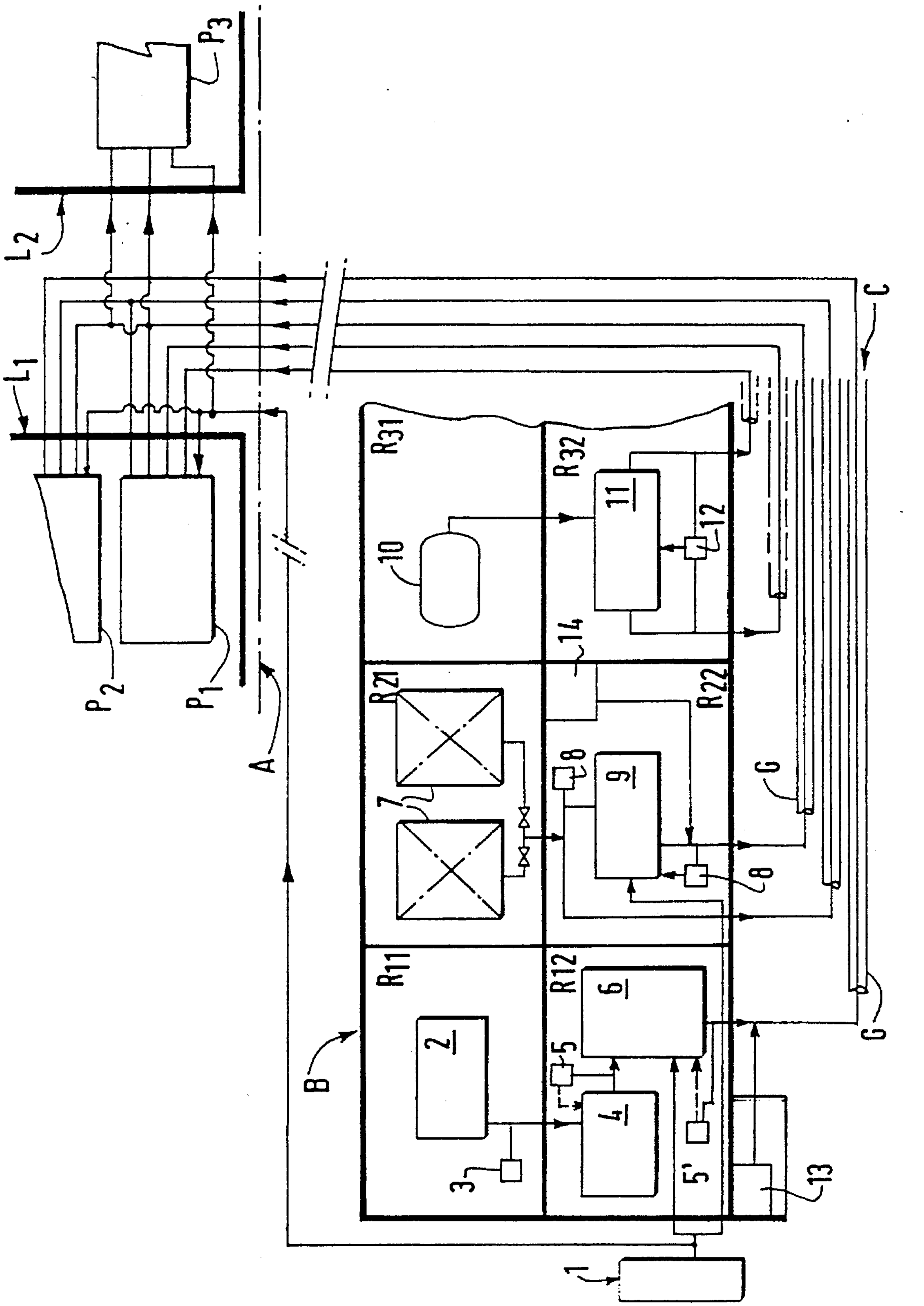
P3
L2
L1
P2
P1
A
C
R31
R32
10
11
12
14
R21
R22
7
8
9
G
R11
R12
B
2
3
4
5
5'
6
13
1

INSTALLATION FOR SUPPLYING FLUID TO A UTILIZATION STATION AT THE UTILIZATION SITE

This application is a division, of application Ser. No. 08/202,497, filed Feb. 28, 1994, now U.S. Pat. No. 5,433, 921.

The present invention relates to a process for supplying at least one pure active gas to at least one utilization station in a first building of a utilization site, in particular for the supply of special so-called "specialty gases" in industries for the production of electronic components, liquid crystal displays "LCD" or electric photocells.

The special active gases, or special gases for electronics (SGE), are in general dangerous gases, because of their toxicity and/or their inflammability, and must, for the applications in question, have a high purity, which is to say be free from polluting or contaminating impurities. The same is true for gases not considered active, typically neutral gases, used as vector gases for controlled quantities of pure active gas or as purge gases for utilization stations or the associated equipment. The active gases cover a wide range, comprising particularly silanes, diboranes, arsine, phosphine, ammonia, corrosive agents, particularly acids, fluorides and chlorides, vector gases or purge gases comprising essentially nitrogen, hydrogen and helium.

At present, the special gases are provided, pure or in mixture with a pure vector gas, in specially treated bottles of various sizes and under high pressures which are also various. These bottles are at present provided, in the building of the utilization station, in cabinets for special gases equipped with safety systems and purge systems to avoid the contamination of the special gases of high purity at the moment of changing bottles. These present systems have very many drawbacks. Thus, the limited size of the bottles requires frequent changing in the special gas cabinets which, in addition to the problems of substitution and manipulation that plague these bottles, require the user to provide, around the building, storage zones for filled reserve bottles and for empty bottles awaiting their return to the supplier, which, like the special gas cabinets, occupy substantial space on the utilization site, especially as this latter generally has a wide range of bottles containing various special pure or mixed gases. On the other hand, these bottles containing high pressure gas (which can be as high as $150\times10^5$ Pa), the special gas cabinets must, in addition to their distribution function, comprise depressurization devices for these gases to bring them to low pressures usable in the utilization stations, generally of the order of 4 or $5\times10^5$ Pa or less. Finally, the frequent changing of the bottles requires regular verification of the quality of the gas (purity and/or mixing rate) which vary as a function of the group of bottles, of the interior condition of these latter and of the condition of their valve.

The present invention has for its object to provide a simplified process for supplying gas eliminating most of the drawbacks mentioned above and giving to the user an increased flexibility and safety of use.

To do this, according to one characteristic of the invention, the process comprises the steps of providing, at the utilization site, a second safety building at a distance from the first building, providing at least one source of active gas in this second building, and transferring, by at least one safety conduit of high cleanliness, the gas at a low pressure, typically less than $5\times10^5$ Pa, to the utilization station.

According to other characteristics of the invention:

the gas is purified in the second building before it is transferred to the conduit;

the pure gas is prepared, and if desired purified in situ in the second building, its purity and/or its mixing rate with the vector gas being also analyzed in the second building.

As will be understood, the process according to the invention permits overcoming the problems mentioned above due to the changing of bottles, particularly the problems of manipulation, often harming the bottles, and the risk of contamination at the moment of changing of these bottles in the special gas cabinets, reducing the cost of exploitation for the user and avoiding the risk of accidents inherent in gas bottles under high pressure.

The present invention also has for its object an installation to provide gas for practicing such a process, comprising a second safety building disposed at a distance from the first building enclosing the utilization station and enclosing at least one source of said active gas, at least one safety conduit of high cleanliness connecting the source to the utilization station in the first building.

Other characteristics and advantages of the present invention will become apparent from the following description, given by way of illustration but not at all limiting, with respect to the accompanying drawing, in which:

the single FIGURE represents schematically a plant located on a utilization site of an installation for supplying special gases according to the invention.

In the single FIGURE, there is shown a first building A enclosing at least one room L1, L2 having a high level of cleanliness and in which is disposed at least one utilization station $P_i$, for example a machine for depositing a thin layer on a slice of semiconductor material.

According to the invention, at a distance from building A, is erected a safety building B, provided with the required safety installations (fire walls with handling and control of the atmosphere and leak detectors) comprising a series of rooms isolated from each other $R_{ij}$. In the illustrated example, the building B, in which is erected a cryogenic unit 1 for the production of high purity nitrogen, of the type called HPN, or with a reservoir and evaporator for liquid nitrogen, conventionally used to supply neutral gas to utilization stations $P_i$, comprises a first section $R_i$ with, in one room $R_{11}$, an apparatus 2 for the generation in situ of phosphine (which is a dopant for silicon) producing at its outlet impure phosphine, under medium pressure, which can be analyzed by an analyzer 3 and which is sent to a purification device 4. The purified phosphine, analyzed by an analyzer 5, is sent to a device 6 for mixing in situ receiving also a flow of pure nitrogen under medium pressure from the unit 1 and supplying at its outlet a predetermined controlled mixture of nitrogen and small quantities of phosphine continuously analyzed by an analyzer 5'. In another section $R_2$ of the building B, a first room $R_{21}$ encloses bottles, or preferably two bundles 7 each containing several bottles of monosilane under pressure, one of the bundles supplying, after expansion to a pressure of the order of $10\times10^5$ Pa, the monosilane, which can be analyzed by an analyzer 8, to a device 9 for mixing in situ, receiving also a flow of pure nitrogen from the unit 1 to supply at its outlet a predetermined controlled mixture of nitrogen in small quantities of silane continuously analyzed by an analyzer 8'. In a first room $R_{31}$ of another section $R_3$ is disposed a reservoir 10 or an apparatus for the in situ generation of an acid, particularly hydrochloric acid, hydrobromic acid or hydrofluoric acid, which is sent at medium pressure to a purification device 11 disposed in an adjacent room $R_{32}$ and which supplies, particularly at two outlets, a high purity gaseous acid analyzed by an analyzer 12.

As is seen in the FIGURE, the different outlets of gas of the safety building B are connected to one or several of the utilization stations $P_i$ in the building A by respective conduits C each comprising a central tube for a high integrity transfer, with a treated internal surface, for example electropolished, disposed in a safety sleeve G in which circulates neutral gas, for example nitrogen, continuously analyzed to detect possible active gas leaks at low pressure in the central tubing.

As is also seen in the single FIGURE, for the sake of safety, in the case of instantaneous malfunction or of breakdown of a mixing device, such as 6 and 9, there is added, to the corresponding section, at least one bottle 13, 14 containing a preconditioned mixture corresponding to that normally available at the outlet of the mixing device 6, 9 and connectible to the corresponding conduit C.

Although the present invention has been described in relation to particular examples, it is not thereby limited but is on the contrary susceptible to modifications and variations which will be apparent to one skilled in the art.

What is claimed is:

1. Installation for supplying at least one pure active fluid to at least one utilization station, in a first building at a utilization site, which comprises also a second building disposed at a distance from the first building and enclosing at least one source of said pure active fluid, and at least one safety conduit of high cleanliness connecting the source of said pure active fluid to the utilization station.

2. Installation according to claim 1, wherein the second building encloses a device for the purification of an impure fluid to produce said pure active fluid interposed between the source and the conduit.

3. Installation according to claims 1, wherein the source of said pure active fluid is a unit for the generation in situ of said pure active fluid.

4. Installation according to claim 1, which further comprises at least one source of vector fluid, the second building enclosing, upstream of the conduit, a device for mixing fluid connected to the source of active fluid and to the source of vector fluid to supply to the conduit a controlled mixture of said fluids.

5. Installation according to claim 4, which further comprises, in the second building, at least one additional reservoir of said mixture of gas connectible to the conduit.

6. Installation according to claim 1, wherein said pure active fluid supplied to said at least one utilization station is a gas.

* * * * *